United States Patent
Archangel et al.

(10) Patent No.: US 9,644,158 B2
(45) Date of Patent: May 9, 2017

(54) FEED INJECTOR FOR A GASIFICATION SYSTEM

(71) Applicant: General Electric Company, Schenectady, NY (US)

(72) Inventors: Danielle Yarber Archangel, Houston, TX (US); Monty Lee Harned, Sugarland, TX (US); Allam Nandakishore, Karnataka (IN); Pallab Karmakar, West Bengal (IN)

(73) Assignee: General Electric Company, Schenectady, NY (US)

( * ) Notice: Subject to any disclaimer, the term of this patent is extended or adjusted under 35 U.S.C. 154(b) by 563 days.

(21) Appl. No.: 14/153,544

(22) Filed: Jan. 13, 2014

(65) Prior Publication Data

US 2015/0197697 A1     Jul. 16, 2015

(51) Int. Cl.
*C10J 3/46* (2006.01)
*F02C 3/04* (2006.01)
(Continued)

(52) U.S. Cl.
CPC ............... *C10J 3/466* (2013.01); *C10J 3/506* (2013.01); *C10K 1/003* (2013.01); *F02C 3/04* (2013.01); *F02C 7/232* (2013.01); *F23D 14/22* (2013.01); *C10J 2200/15* (2013.01); *C10J 2200/152* (2013.01); *C10J 2300/0933* (2013.01); *C10J 2300/0956* (2013.01); *C10J 2300/0976* (2013.01); *C10J 2300/165* (2013.01); *F23D 2212/10* (2013.01); *Y02E 20/16* (2013.01); *Y02E 20/18* (2013.01)

(58) Field of Classification Search
CPC .......... C10J 3/466; C10K 1/003; F02C 7/232; F23D 14/22; F23D 2201/10; F23D 2212/10; F23D 1/04; F23D 1/00; F23D 14/58; F23C 5/02; F23C 5/06; F23C 7/00; F23C 2900/07021
USPC .......................................................... 60/740
See application file for complete search history.

(56) References Cited

U.S. PATENT DOCUMENTS 3,977,660 A    8/1976 Nakahira
4,580,524 A    4/1986 Lackey, Jr. et al.
(Continued)

FOREIGN PATENT DOCUMENTS

DE    102004029029 A1    1/2006

OTHER PUBLICATIONS

PCT Search Report and Written Opinion issued in corresponding PCT Application No. PCT/US2014/070272 on Mar. 27, 2015.

*Primary Examiner* — Christopher Demeree
(74) *Attorney, Agent, or Firm* — Eversheds Sutherland (US) LLP (57) ABSTRACT

The present disclosure provides a feed injector for a gasification system. The feed injector may include an inner tube defining an inner feed passage therein, an intermediate tube defining an intermediate feed passage therein, and an outer tube defining an outer feed passage therein. The outer tube may include an outer tube pipe portion and an outer tube tip portion attached to one another, and the outer tube tip portion may be formed of a ceramic matrix composite, a sintered Silicon Carbide, or a sintered Silicon Nitride. The present disclosure also provides a related method of operating a feed injector of a gasification system as well as a related integrated gasification combined cycle power plant.

20 Claims, 7 Drawing Sheets

(51) Int. Cl.
  *F02C 7/232* (2006.01)
  *C10J 3/50* (2006.01)
  *F23D 14/22* (2006.01)
  *C10K 1/00* (2006.01)

(56) References Cited

U.S. PATENT DOCUMENTS

| | | |
|---|---|---|
| 4,861,229 A | 8/1989 | Halstead |
| 5,108,963 A | 4/1992 | Fu et al. |
| 5,139,191 A | 8/1992 | Velterop |
| 5,454,999 A | 10/1995 | Jayashankar et al. |
| 5,486,496 A | 1/1996 | Talbert et al. |
| 5,672,554 A | 9/1997 | Mohri et al. |
| 5,954,900 A | 9/1999 | Hegner et al. |
| 6,151,887 A | 11/2000 | Haidn et al. |
| 6,246,740 B1 | 6/2001 | Maruyama et al. |
| 6,349,542 B1 | 2/2002 | Moore, III |
| 6,365,259 B1 | 4/2002 | Brundage et al. |
| 6,427,900 B1 | 8/2002 | Hegner et al. |
| 6,444,063 B2 | 9/2002 | Hanzawa et al. |
| 6,670,021 B2 | 12/2003 | Schroder et al. |
| 7,056,467 B2 | 6/2006 | Kang et al. |
| 7,125,514 B2 | 10/2006 | Okamura et al. |
| 7,404,922 B2 | 7/2008 | Kohyama et al. |
| 7,416,404 B2 | 8/2008 | Chan et al. |
| 7,507,484 B2 | 3/2009 | Kulkarni et al. |
| 7,722,731 B2 | 5/2010 | Routbort et al. |
| 7,794,826 B2 | 9/2010 | Fukagawa et al. |
| 8,047,004 B2 | 11/2011 | Brown et al. |
| 8,177,145 B2 | 5/2012 | Bhaisora et al. |
| 8,262,345 B2 | 9/2012 | Andrew |
| 9,200,803 B2 * | 12/2015 | Pan .................. F23D 14/78 |
| 2002/0010071 A1 | 1/2002 | Cohen |
| 2002/0092774 A1 | 7/2002 | Bates et al. |
| 2003/0196576 A1 * | 10/2003 | Whittaker ................ C10J 3/506 110/260 |
| 2004/0112091 A1 | 6/2004 | Roba et al. |
| 2005/0230884 A1 | 10/2005 | Schallner et al. |
| 2007/0246575 A1 * | 10/2007 | Cairo .................... B05B 7/0433 239/589 |
| 2010/0003402 A1 | 1/2010 | Stout et al. |
| 2010/0263841 A1 | 10/2010 | Corry et al. |
| 2011/0077141 A1 | 3/2011 | Walker et al. |
| 2012/0021244 A1 | 1/2012 | Chang et al. |
| 2012/0036776 A1 | 2/2012 | Stevenson et al. |
| 2012/0039761 A1 * | 2/2012 | Sprouse .................. C10J 3/506 422/200 |
| 2012/0196237 A1 * | 8/2012 | Murray .................. F23D 14/46 431/354 |
| 2012/0210718 A1 | 8/2012 | Lacy et al. |
| 2012/0237411 A1 | 9/2012 | Steinhaus et al. |
| 2012/0317992 A1 | 12/2012 | Ryu et al. |
| 2012/0318887 A1 | 12/2012 | Pan |

* cited by examiner

FEED INJECTOR FOR A GASIFICATION SYSTEM

TECHNICAL FIELD

The present application and the resultant patent relate generally to gasification systems and more particularly relate to a feed injector for a gasification system to address risks of cracking, corrosion, and erosion.

BACKGROUND OF THE INVENTION

Gasification systems may be used in various applications, including chemical production systems and power systems. For example, combined cycle power systems generally may include a gasification system that is integrated with a gas turbine engine and other components to produce power. The gasification system may include a gasifier configured to receive a mixture of fuel, air/oxygen, steam, and possibly other materials therein to produce a partially oxidized gas known as "syngas." The resulting syngas ultimately may be directed to other components of the combined cycle power system, such as a combustor of the gas turbine engine, for combustion therein.

The gasification system also may include a feed injector configured to atomize and mix the fuel, air/oxygen, steam, and other possible materials, and to deliver the mixture to a reaction zone of the gasifier. During operation, the feed injector may be exposed to temperature extremes within the gasifier. Specifically, a tip of the feed injector, which may extend into the reaction zone of the gasifier, may be exposed to gasification reaction temperatures of up to about 2600° F. (1427° C.). Such high temperatures may inhibit effective operation of the feed injector and may shorten the life span of the feed injector tip. Further, the feed injector may be exposed to corrosive elements carried in the syngas produced within the gasifier, resulting in an effect known as "sulfur attack." Over time, such corrosion also may inhibit effective operation of the feed injector and may shorten the life span of the feed injector tip.

In order to protect the feed injector from the adverse effects of high reaction temperatures, certain gasification systems may include a closed-loop water cooling system to provide cooling water to the feed injector tip. The closed-loop water cooling system, however, may be complex to manufacture and costly to operate. Further, use of the cooling system may produce areas of localized strain and may result in cracking of the feed injector tip. Specifically, the metal temperatures between an internal air/oxygen passage and an internal cooling water passage about the feed injector tip may be relatively low compared to the metal temperatures along an outer surface of the feed injector tip exposed to the reaction zone. For example, the temperature difference may be a multiple of about ten (10) times or so. The stiffness of the metal may decrease as the temperature increases, and thus the metal along the hotter outer surface may elongate more than the metal along the cooler inner surface, resulting in an area of high thermal strain and stress therebetween. Over time, this area of high thermal strain and stress may result in cracking of the feed injector tip or other damage thereto. Such cracking also may be facilitated by mechanical stress due to a pressure difference across the feed injector tip. Ultimately, cracking of the feed injector tip may allow the syngas to penetrate into the cooling water passage and contaminate the water therein, requiring costly and time-consuming shutdown of the gasification system and replacement of the feed injector.

Certain feed injectors may include a number of bayonet-style tubes arranged in a concentric manner and defining a number of concentric feed passages therethrough. For example, a feed injector may include three tubes, an outer tube, an intermediate tube, and an inner tube, which define an outer feed passage, an intermediate feed passage, and an inner feed passage, respectively. According to certain arrangements, the outer and inner feed passages each may deliver a flow of air/oxygen, and the intermediate feed passage may deliver a flow of fuel, such as oil, gas, or coal slurry. In this manner, the tubes may be subjected to high pressures and high velocities of the flows of air/oxygen passed therethrough, which may inhibit effective operation of the tubes and may shorten the life span of the tubes. Moreover, when the flow of fuel is coal slurry, the tubes may be impinged upon by coal particles traveling at high velocities, resulting in an effect known as "slurry erosion." Such erosion may be particularly significant at the tips of the tubes, increasing the tip openings over time and thus decreasing the flow velocity of the coal slurry and the overall performance of the feed injector.

According to certain bayonet-style feed injectors, each of the tubes may include a pipe portion and a tip portion fastened to one another, for example, by welding. In this manner, the tip portion may be replaced periodically due to cracking, corrosion, or erosion that may occur as discussed above. However, replacement of the tip portion may require costly and time-consuming shutdown of the gasification system and may be particularly complex when the gasification system includes a cooling system connected to the tip portion, for example, by welding. Moreover, the cost of replacement tip portions may be significant due to the expensive materials required to even temporarily tolerate the high temperatures, pressures, and velocities experienced during operation of the gasification system.

There is thus a desire for an improved feed injector configured to deliver a mixture of fuel, air/oxygen, and steam to a gasifier of a gasification system. Specifically, such a feed injector should address the risks of cracking, corrosion, and erosion of the feed injector tip to increase the life span of the feed injector, while providing acceptable operability at the high temperatures, pressures, and velocities experienced during operation of the gasification system. Moreover, such a feed injector should reduce the complexity and cost of manufacturing and operating the feed injector. Further, such a feed injector should reduce the frequency and duration of replacement thereof and thus should reduce costly shutdown of the gasification system and the overall system in which it is used, such as a combined cycle power system.

SUMMARY OF THE INVENTION

The present application and the resultant patent thus provide a feed injector for a gasification system. The feed injector may include an inner tube defining an inner feed passage therein, an intermediate tube defining an intermediate feed passage therein, and an outer tube defining an outer feed passage therein. The outer tube may include an outer tube pipe portion and an outer tube tip portion attached to one another, and the outer tube tip portion may be formed of a ceramic matrix composite, a sintered Silicon Carbide, or a sintered Silicon Nitride.

The present application and the resultant patent also provide a method of operating a feed injector of a gasification system. The method may include the steps of directing a first flow of air through an inner feed passage defined within an inner tube, directing a flow of fuel through an intermediate feed passage defined within an intermediate tube, directing a second flow of air through an outer feed passage defined within an outer tube, and mixing the first flow of air, the second flow of air, and the flow of fuel within a reaction zone of a gasifier to produce a syngas. The outer tube may include an outer tube pipe portion and an outer tube tip portion attached to one another, and the outer tube tip portion may be formed of a ceramic matrix composite, a sintered Silicon Carbide, or a sintered Silicon Nitride.

The present application and the resultant patent further provide an integrated gasification combined cycle power plant. The power plant may include a gas turbine engine including a compressor, a combustor in communication with the compressor, and a turbine in communication with the combustor. The power plant also may include a gasification system including a gasifier and a feed injector. The feed injector may include an inner tube defining an inner feed passage therein, an intermediate tube defining an intermediate feed passage therein, and an outer tube defining an outer feed passage therein. The outer tube may include an outer tube pipe portion and an outer tube tip portion attached to one another, and the outer tube tip portion may be formed of a ceramic matrix composite, a sintered Silicon Carbide, or a sintered Silicon Nitride.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
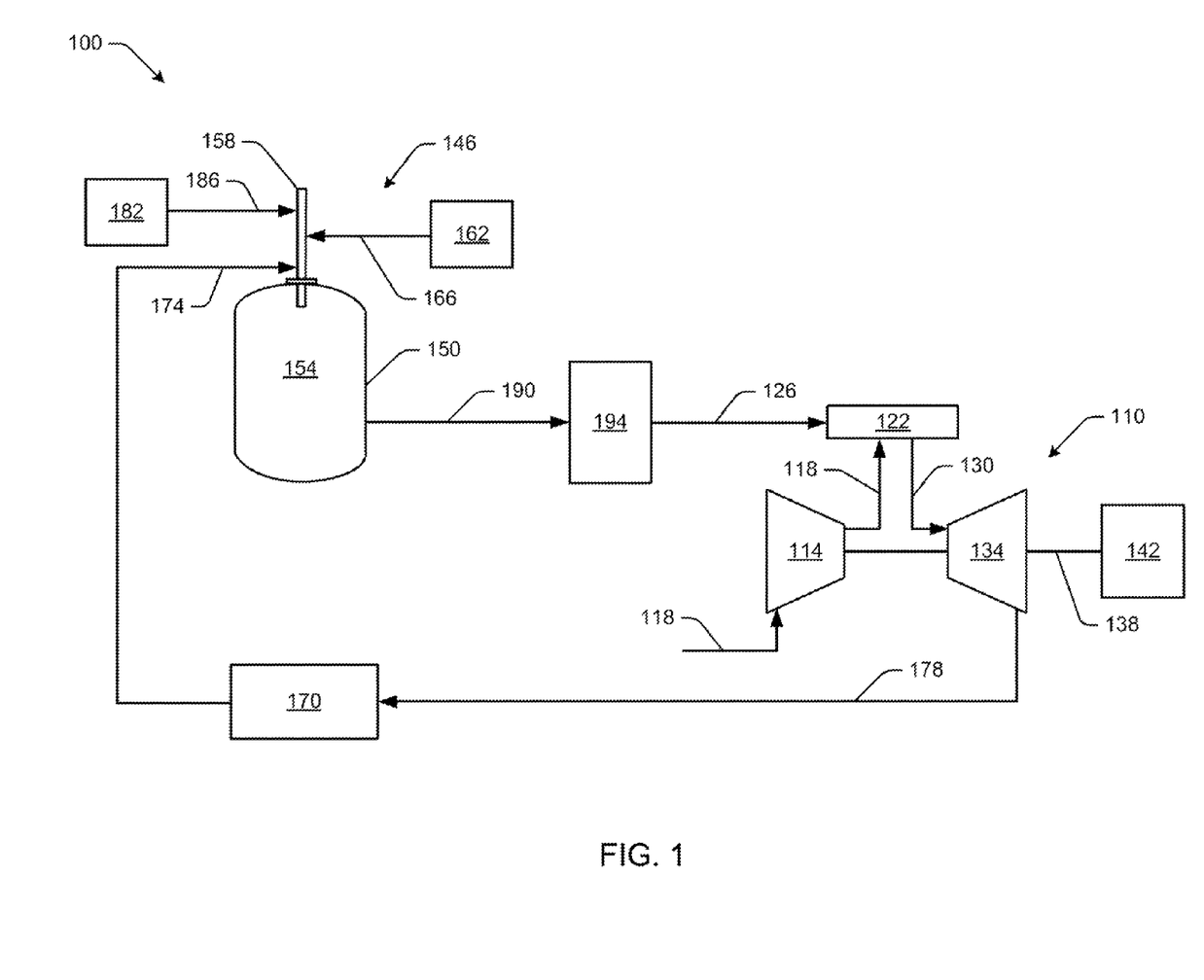
FIG. 1 is a schematic diagram of portions of an integrated gasification combined cycle power plant including a gas turbine engine and a gasification system.

Referring now to the drawings, in which like numerals refer to like elements throughout the several views, FIG. 1 shows a schematic diagram of portions of an integrated gasification combined cycle ("IGCC") power plant 100 as may be used herein. Only those components related to the subject matter described herein are shown for purposes of simplification. The overall IGCC power plant 100 may have many other configurations and may include many other types of components in addition to those shown in FIG. 1 and described herein below.

The IGCC power plant 100 may include one or more gas turbine engines 110. As is known, the gas turbine engine 110 may include a compressor 114. The compressor 114 compresses an incoming flow of air 118. The compressor 114 delivers the compressed flow of air 118 to a combustor 122. The combustor 122 mixes the compressed flow of air 118 with a pressurized flow of fuel 126 and ignites the mixture to create a flow of combustion gases 130. Although only a single combustor 122 is shown, the gas turbine engine 110 may include any number of combustors 122. The flow of combustion gases 130 is in turn delivered to a turbine 134. The flow of combustion gases 130 drives the turbine 134 so as to produce mechanical work. The mechanical work produced in the turbine 134 drives the compressor 114 via a shaft 138 and an external load 142 such as an electrical generator and the like. The gas turbine engine 110 may have many other configurations and may include many other types of components.

The gas turbine engine 110 may be any one of a number of different gas turbine engines offered by General Electric Company of Schenectady, N.Y., including, but not limited to, those such as a 7 or a 9 series heavy duty gas turbine engine and the like. The gas turbine engine 110 may have different configurations and may include other types of components. Other types of gas turbine engines also may be used herein. The gas turbine engine 110 may use natural gas, liquid fuels, various types of syngas, and/or other types of fuels and combinations thereof. The IGCC power plant 100 may include multiple gas turbine engines 110, other types of turbines, and other types of power generation equipment.

The IGCC power plant 100 also may include a gasification system 146 configured to produce the flow of fuel 126 used by the combustor 122 of the gas turbine engine 110. The gasification system 146 may include a gasifier 150 configured to receive a mixture of fuel, air/oxygen, steam, and possibly other materials to produce syngas within a reaction zone 154 defined therein. The gasification system 146 also may include a feed injector 158 configured to atomize and mix the fuel, air/oxygen, steam, and other possible materials, and to deliver the mixture to the reaction zone 154 of the gasifier 150.

As is shown, the feed injector 158 may be in communication with a fuel source 162 for receiving a flow of fuel 166, such as oil, gas, or coal slurry, therefrom. The feed injector 158 also may be in communication with an air source, such as an air separation unit 170 for receiving a flow of air 174, such as oxygen, therefrom. The air separation unit 170 may be in communication with the turbine 134 for receiving a flow of extraction air 178 therefrom. In some embodiments, the feed injector 158 further may be in communication with a steam source 182 for receiving a flow of steam 186 therefrom. As is shown, a tip portion of the feed injector 158 may extend into the reaction zone 154 to deliver the mixture of the fuel, air/oxygen, steam, and other possible materials thereto.

The gasifier 150 may produce a flow of raw syngas 190 via a partial oxidation process carried out according to one of several known techniques. The flow of raw syngas 190 may be directed to an acid gas removal system 194, as is shown. The acid gas removal system 194 may remove carbon dioxide, hydrogen sulfide ($H_2S$), and other gases from the raw syngas 190. Specifically, the acid gases may be removed via a catalytic process, a solvent, or other known techniques. In this manner, the acid gas removal system 194 may produce a flow of clean syngas, which may be used as the flow of fuel 126 directed to the combustor 122 of the gas turbine engine 110 for combustion in the manner described above or otherwise.

The gasification system 146 may have many other configurations and may include many other types of components for carrying out additional steps in producing and conditioning the flow of clean syngas. Specifically, a number of other steps may be carried out between the gasifier 150 and the acid gas removal system 194, such as particulate scrubbing, cooling, hydrolysis, water gas shift, mercury removal, and other steps. Likewise, clean syngas heating and moisture addition may be carried out between the acid gas removal system 194 and the combustor 122 of the gas turbine engine 110.

Figure 2:
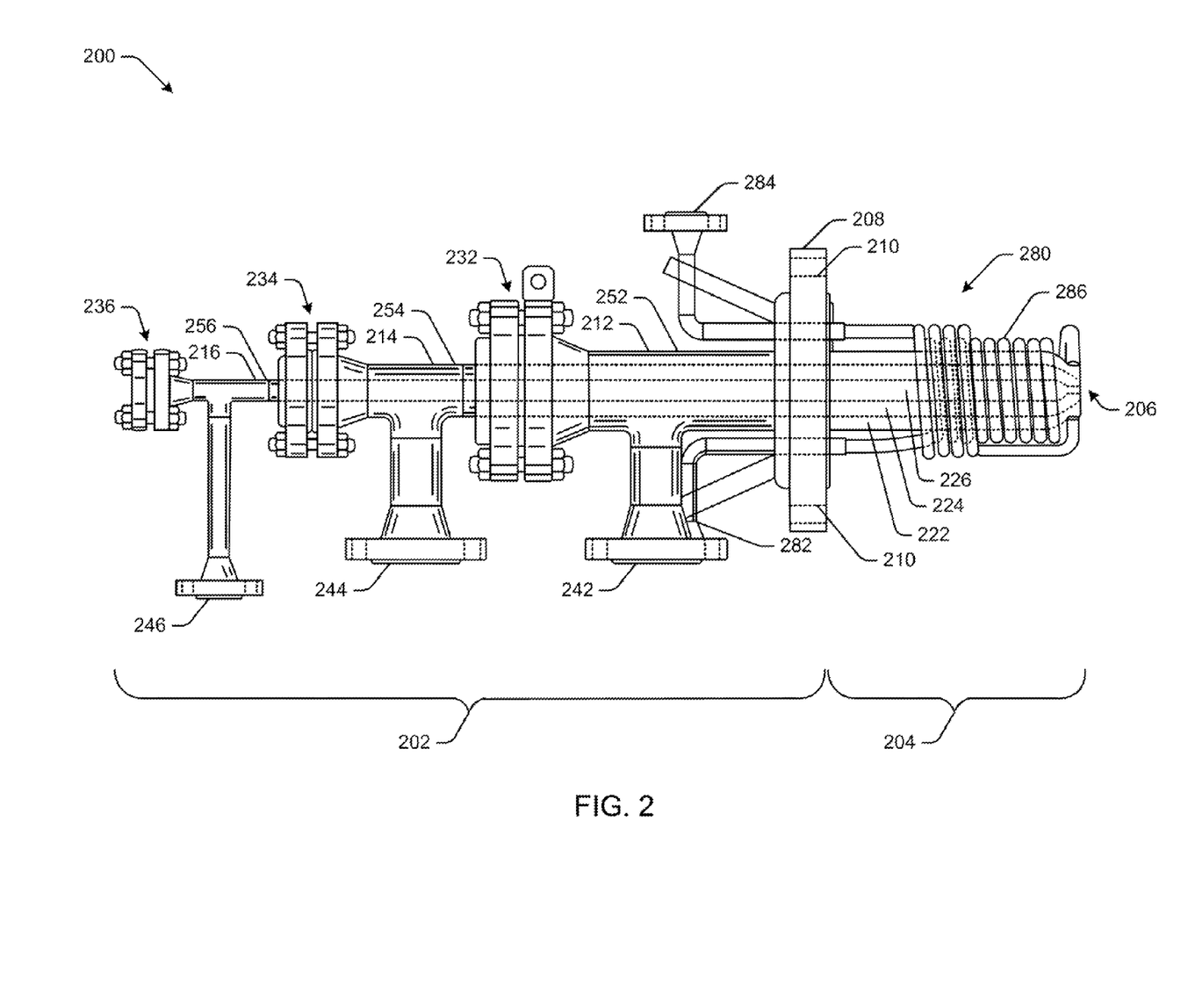
FIG. 2 is a side plan view of a known feed injector as may be used in the gasification system of the integrated gasification combined cycle power plant of FIG. 1.
Figure 3:
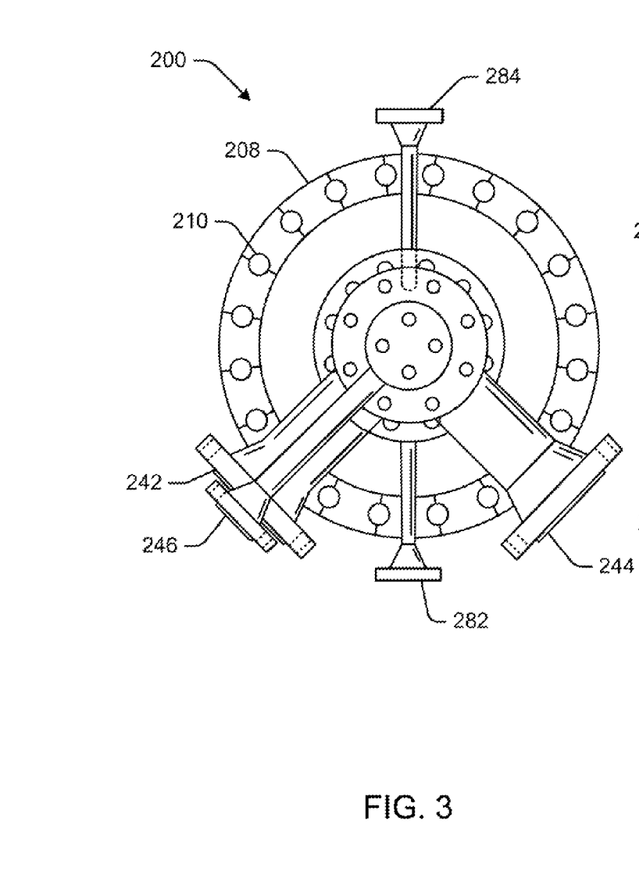
FIG. 3 is an end plan view of the known feed injector of FIG. 2.
Figure 4:
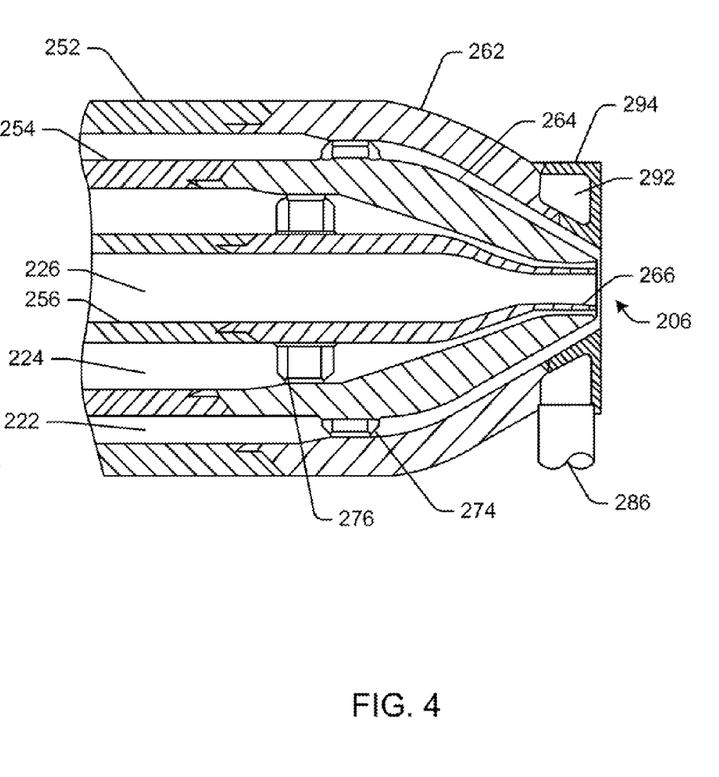
FIG. 4 is a detailed side cross-sectional view of portions of the known feed injector of FIG. 2.

FIGS. 2-4 show various views of a known feed injector 200 as may be used in the gasification system 146 of the IGCC power plant 100. The feed injector 200 may include an upstream portion 202 configured to be positioned outside of the gasifier 150 and to receive the flow of fuel 166, the flow of air 174, and the flow of steam 186 for atomization and mixing. The feed injector 200 also may include a downstream portion 204 configured to be positioned inside of the gasifier 150 and to deliver the mixture of the fuel, air/oxygen, and steam to the reaction zone 154 via a tip end 206. The feed injector 200 further may include a mounting flange 208 configured for mounting the feed injector 200 to the gasifier 150 such that the upstream portion 204 is positioned outside of the gasifier 150 and the downstream portion 206 is positioned inside of the gasifier 150 for operation. The mounting flange 208 may define a number of mounting holes 210 therein for connecting the mounting flange 208 to the gasifier 150 via a number of bolts, screws, or other fasteners.

According to a known configuration, the feed injector 200 may include a number of bayonet-style tubes arranged in a concentric manner and defining a number of concentric feed passages therethrough. Specifically, the feed injector 200 may include three tubes, an outer tube 212, an intermediate tube 214, and an inner tube 216, which define an outer feed passage 222, an intermediate feed passage 224, and an inner feed passage 226, respectively. As is shown, the outer tube 212 and the outer feed passage 222 may extend from the tip end 206 of the feed injector 200 to an outer tube coupling 232. In a similar manner, the intermediate tube 214 and the intermediate feed passage 224 may extend from the tip end 206 of the feed injector 200 to an intermediate tube coupling 234. Finally, the inner tube 216 and the inner feed passage 226 may extend from the tip end 206 of the feed injector 200 to an inner tube coupling 232. The feed injector 200 may include any number of tubes defining any number of feed passages.

The feed injector 200 further may include an outer tube inlet 242, an intermediate tube inlet 244, and an inner tube inlet 246 attached to the outer tube 212, the intermediate tube 214, and the inner tube 216, respectively, along the upstream portion 202 of the feed injector 200. The outer tube inlet 242 may be configured to direct a first portion of the flow of air 174 into the outer feed passage 222 for passage therethrough and into the gasifier 150. In some embodiments, the outer tube inlet 242 also may be configured to direct a portion of the flow of steam 186 into the outer feed passage 222. The intermediate tube inlet 244 may be configured to direct the flow of fuel 166 into the intermediate feed passage 224 for passage therethrough and into the gasifier 150. In some embodiments, the intermediate tube inlet 244 also may be configured to direct a portion of the flow of steam 186 into the intermediate feed passage 224. The inner tube inlet 246 may be configured to direct a second portion of the flow of air 174 into the inner feed passage 226 for passage therethrough and into the gasifier 150. In some embodiments, the inner tube inlet 246 also may be configured to direct a portion of the flow of steam 186 into the inner feed passage 226.

As is shown, the bayonet-style tubes of the feed injector 200 each may include a pipe portion and a tip portion fastened to one another by welding. Specifically, the outer tube 212 may include an outer tube pipe portion 252 and an outer tube tip portion 262, the intermediate tube 214 may include an intermediate tube pipe portion 254 and an intermediate tube tip portion 264, and the inner tube 216 may include an inner tube pipe portion 256 and an inner tube tip portion 266. In this manner, the tip portions of the tubes may be replaced periodically due to cracking, corrosion, or erosion that may occur as discussed herein above during operation of the feed injector 200. In some embodiments, one or more of the tubes may include one or more centering fins configured to maintain the concentric arrangement of the tubes and the feed passages. For example, the intermediate tube 214 may include intermediate tube centering fins 274 attached to the intermediate tube tip portion 264, and the inner tube 216 may include inner tube centering fins 276 attached to the inner tube tip portion 266. The centering fins may be attached to the respective tip portion, for example, by welding.

The feed injector 200 further may include a water cooling system 280 configured to circulate a flow of cooling water about the downstream portion 204 of the feed injector 200. The water cooling system 280 may include a water cooling inlet 282, a water cooling outlet 284, and a water cooling coil 286. The water cooling coil 286 may be positioned about the outer tube 212 near the tip end 206 of the feed injector 200, as is shown. In this manner, circulation of cooling water through the water cooling coil 286 may facilitate cooling of the tip portions of the tubes, particularly the outer tube tip portion 262, during operation of the feed injector 200. As is shown, the water cooling coil 286 may be attached to a water cooling passage 292 defined in a ring region 294 of the outer tube tip portion 262, for example, by welding.

The components of the feed injector 200 traditionally may be formed of various metals or metal alloys. For example, the mounting flange 208 may be formed of SA182 F11 C12 chromium-molybdenum alloy, the outer tube pipe portion 252 may be formed of INCONEL 625 nickel-chromium alloy, the outer tube tip portion 262 may be formed of HAYNESS 188 cobalt-nickel-chromium-tungsten alloy or UMCO 50 cobalt-chromium alloy, the intermediate tube tip portion 264 may be formed of HAYNESS 188 cobalt-nickel-chromium-tungsten alloy, the inner tube tip portion 266 may be formed of HAYNESS 188 cobalt-nickel-chromium-tungsten alloy, and the water cooling coil 286 may be formed of INCONEL 625 nickel-chromium alloy. These components generally may be forged, machined, and then welded together as described herein above.

Figure 5:
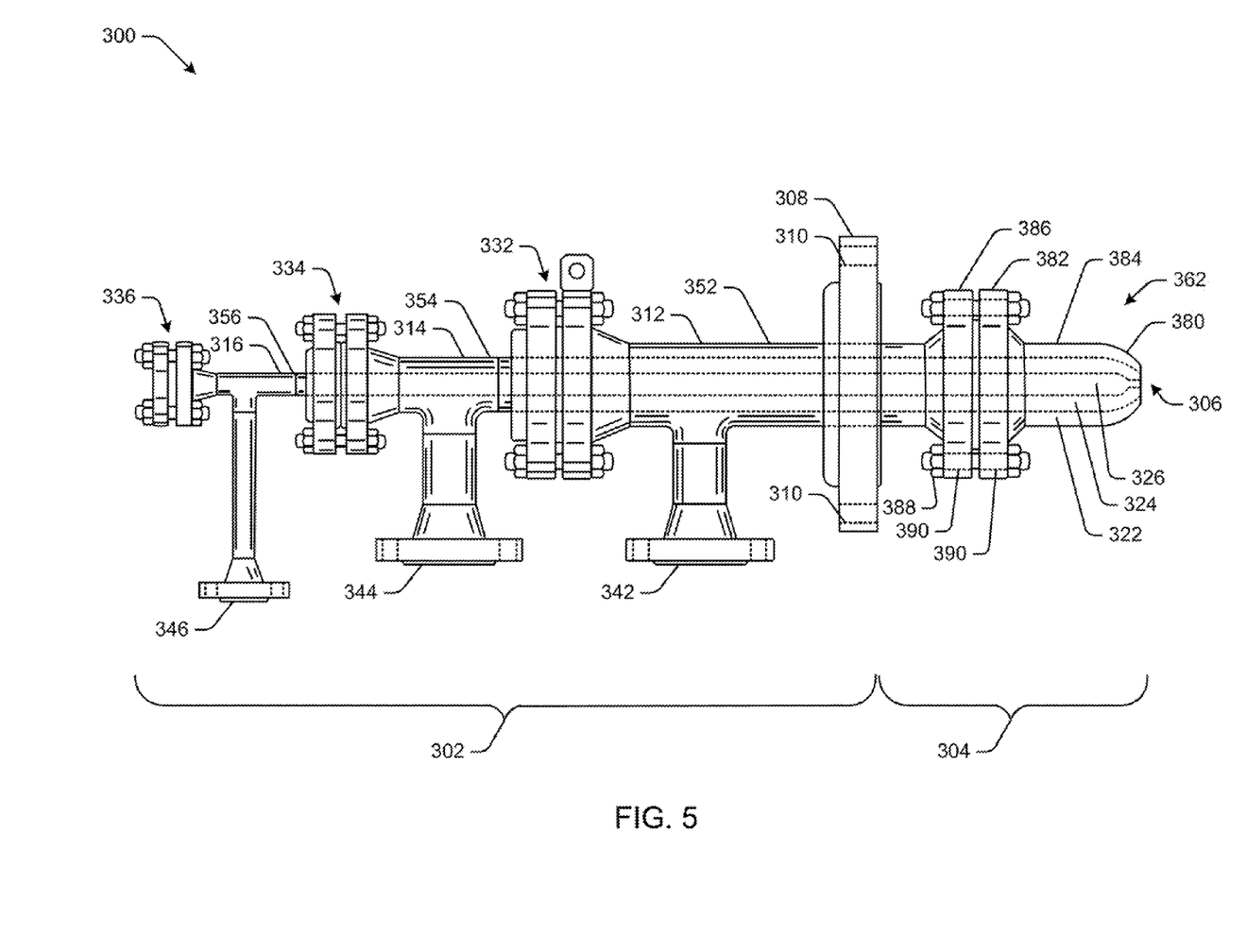
FIG. 5 is a side plan view of a feed injector as may be described herein and as may be used in the gasification system of the integrated gasification combined cycle power plant of FIG. 1.
Figure 6:
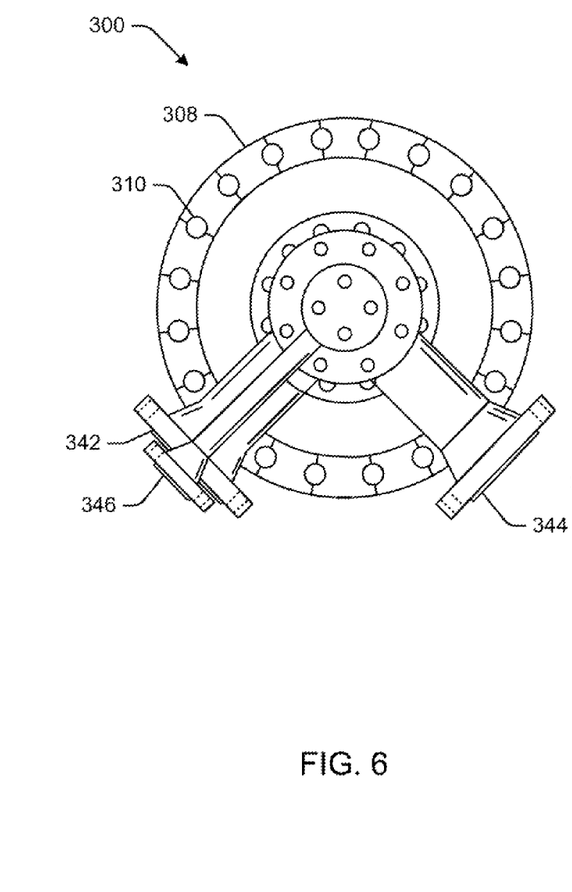
FIG. 6 is an end plan view of the feed injector of FIG. 5.
Figure 7:
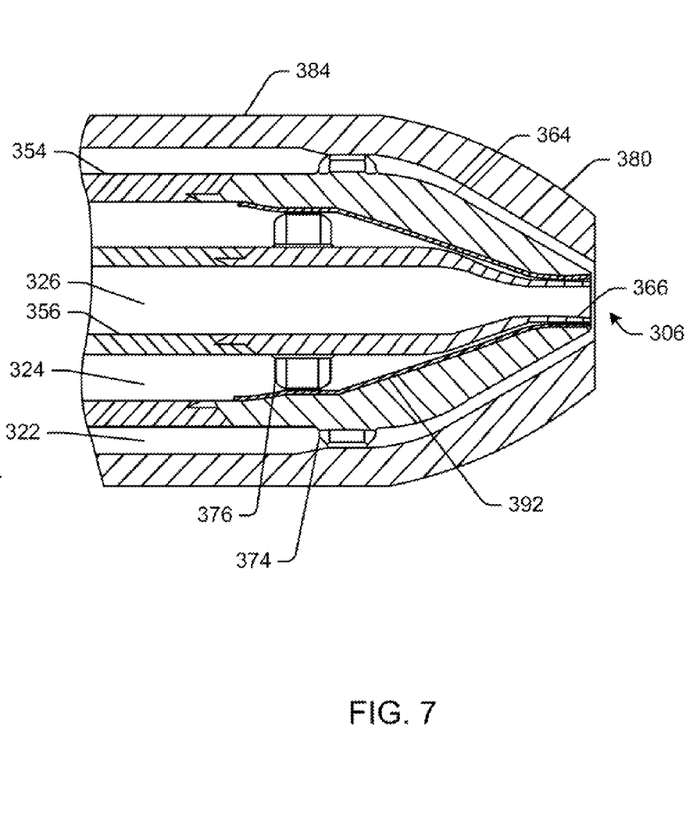
FIG. 7 is a detailed side cross-sectional view of portions of the feed injector of FIG. 5.

FIGS. 5-7 show various views of a feed injector 300 as may be described herein and as may be used in the gasification system 146 of the IGCC power plant 100. Although the feed injector 300 may be described herein as being used in the IGCC power plant 100, it will be understood that the feed injector 300 may be used in gasification systems of various chemical production systems and power systems. The feed injector 300 may include certain components corresponding to those described with respect to the feed injector 200, although certain differences in structure and function may be described herein below. The feed injector 300 may include an upstream portion 302 configured to be positioned outside of the gasifier 150 and to receive the flow of fuel 166, the flow of air 174, and the flow of steam 186 for atomization and mixing. The feed injector 300 also may include a downstream portion 304 configured to be positioned inside of the gasifier 150 and to deliver the mixture of the fuel, air/oxygen, and steam to the reaction zone 154 via a tip end 306. The feed injector 300 further may include a mounting flange 308 configured for mounting the feed injector 300 to the gasifier 150 such that the upstream portion 304 is positioned outside of the gasifier 150 and the downstream portion 306 is positioned inside of the gasifier 150 for operation. The mounting flange 308 may define a number of mounting holes 310 therein for connecting the mounting flange 308 to the gasifier 150 via a number of bolts, screws, or other fasteners.

The feed injector 300 may include a number of bayonet-style tubes arranged in a concentric manner and defining a number of concentric feed passages therethrough. Specifically, the feed injector 300 may include three tubes, an outer tube 312, an intermediate tube 314, and an inner tube 316, which define an outer feed passage 322, an intermediate feed passage 324, and an inner feed passage 326, respectively. As is shown, the outer tube 312 and the outer feed passage 322 may extend from the tip end 306 of the feed injector 300 to an outer tube coupling 332. In a similar manner, the intermediate tube 314 and the intermediate feed passage 324 may extend from the tip end 306 of the feed injector 300 to an intermediate tube coupling 334. Finally, the inner tube 316 and the inner feed passage 326 may extend from the tip end 306 of the feed injector 300 to an inner tube coupling 332. The feed injector 300 may include any number of tubes defining any number of feed passages.

The feed injector 300 further may include an outer tube inlet 342, an intermediate tube inlet 344, and an inner tube inlet 346 attached to the outer tube 312, the intermediate tube 314, and the inner tube 316, respectively, along the upstream portion 302 of the feed injector 300. The outer tube inlet 342 may be configured to direct a first portion of the flow of air 174 into the outer feed passage 322 for passage therethrough and into the gasifier 150. In some embodiments, the outer tube inlet 342 also may be configured to direct a portion of the flow of steam 186 into the outer feed passage 322. The intermediate tube inlet 344 may be configured to direct the flow of fuel 166 into the intermediate feed passage 324 for passage therethrough and into the gasifier 150. In some embodiments, the intermediate tube inlet 344 also may be configured to direct a portion of the flow of steam 186 into the intermediate feed passage 324. The inner tube inlet 346 may be configured to direct a second portion of the flow of air 174 into the inner feed passage 326 for passage therethrough and into the gasifier 150. In some embodiments, the inner tube inlet 346 also may be configured to direct a portion of the flow of steam 186 into the inner feed passage 326.

As is shown, the bayonet-style tubes of the feed injector 300 each may include a pipe portion and a tip portion fastened to the pipe portion. Specifically, the outer tube 312 may include an outer tube pipe portion 352 and an outer tube tip portion 362 as may be fastened to the outer tube pipe portion 352 in a manner described in detail herein below. The intermediate tube 314 may include an intermediate tube pipe portion 354 and an intermediate tube tip portion 364 fastened to the intermediate tube pipe portion 354, for example, by welding. The inner tube 316 similarly may include an inner tube pipe portion 356 and an inner tube tip portion 366 fastened to the inner tube pipe portion 356, for example, by welding. In this manner, the tip portions of the tubes may be replaced when necessary due to cracking, corrosion, or erosion that may occur as discussed herein above during operation of the feed injector 300. In some embodiments, one or more of the tubes may include one or more centering fins configured to maintain the concentric arrangement of the tubes and the feed passages. For example, the intermediate tube 314 may include intermediate tube centering fins 374 extending from the intermediate tube tip portion 364, and the inner tube 316 may include inner tube centering fins 376 extending from the inner tube tip portion 366. In some embodiments, the centering fins may be integrally formed with the respective tip portion as a single component. Alternatively, the centering fins may be attached to the respective tip portion, for example, by welding.

The outer tube tip portion 362 may include a tip region 380 having a tapered nozzle shape, a flange region 382 having a disc shape, and a pipe region 384 having a tubular shape extending between the tip region 380 and the flange region 382. As is shown, the tip region 380, the flange region 382, and the pipe region 384 of the outer tube tip portion 362 may be integrally formed as a single component. The outer tube pipe portion 352 also may include a flange region 386 having a disc shape and fastened to the flange region 382 of the outer tube tip portion 362. Specifically, the outer tube pipe portion 352 and the outer tube tip portion 362 may be fastened to one another via a number of bolts, screws, or other fasteners 388 extending through mating holes 390 defined in the respective flange regions 382, 386, as is shown. Alternatively, the outer tube pipe portion 352 and the outer tube tip portion 362 may be fastened to one another via one or more clamps extending over the respective flange regions 382, 386.

As is shown, one or more of the bayonet-style tubes of the feed injector 300 may include a tip insert or a tip covering attached to the tip portion thereof. In some embodiments, the intermediate tube 314 may include an intermediate tube tip insert 392 attached to the intermediate tube tip portion 364. Specifically, the intermediate tube tip insert 392 may be press fitted within the intermediate tube tip portion 364, as is shown. In this manner, the intermediate tube tip insert 392 may conform to the inner surface of the intermediate tube tip portion 364 and may extend between the inner surface and the intermediate feed passage 324. Accordingly, the intermediate tube tip insert 392 may act as a barrier between the intermediate tube tip portion 364 and the flow of fuel 166 directed through the intermediate feed passage 324 to prevent erosion of the intermediate tube tip portion 364. In a similar manner, the inner tube 316 may include an inner tube tip covering (not shown) that may be press fitted over the outer surface of the inner tube tip portion 366. Accordingly, the inner tube tip covering may act as a barrier between the inner tube tip portion 366 and the flow of fuel directed through the intermediate feed passage 324 to prevent erosion of the inner tube tip portion 366. Although the specific embodiments of a tip insert and a tip covering may be described herein as applied to the intermediate tube 314 and the inner tube 316, respectively, it should be apparent that any of the tubes of the feed injector 300 may include a tip insert or a tip covering configured in a similar manner. The tip inserts or tip coverings of the tubes may be replaced when necessary due to cracking, corrosion, or erosion that may occur as discussed herein above during operation of the feed injector 300.

Certain components of the feed injector 300 may be formed of various metals or metal alloys. For example, the mounting flange 308 may be formed of SA182 F11 C12 chromium-molybdenum alloy, the outer tube pipe portion 352 may be formed of INCONEL 625 nickel-chromium alloy or INCONEL 600 nickel-chromium alloy, the intermediate tube tip portion 364 may be formed of HAYNESS 188 cobalt-nickel-chromium-tungsten alloy, and the inner tube tip portion 366 may be formed of HAYNESS 188 cobalt-nickel-chromium-tungsten alloy. These components generally may be forged, machined, and welded together as described herein above.

In contrast to the metal or metal alloy components, certain components of the feed injector 300 may be formed of various ceramic materials. For example, the outer tube tip portion 362 may be formed of a ceramic matrix composite including a consistent set of ceramic fibers embedded in a ceramic matrix to form a fiber reinforced ceramic. In this manner, when the tip region 380, the flange region 382, and the pipe region 384 of the outer tube tip portion 362 are integrally formed as a single component, the consistent set of ceramic fibers extends through the regions 380, 382, 384 of the outer tube tip portion 362. Specifically, the ceramic matrix composite may be a melt-infiltrated SiC/SiC matrix composite. Alternatively, the ceramic matrix composite may be a C/SiC matrix composite, an Al/SiC matrix composite, or a Mg/SiC matrix composite. In other embodiments, the outer tube tip portion 362 may be formed of a sintered Silicon Carbide or a sintered Silicon Nitride. The tip inserts or tip coverings of the tubes may be formed of a ceramic composite. In some embodiments, the intermediate tube tip insert 392 may be formed of an alumina ceramic composite. Alternatively, the intermediate tube tip insert 392 may be formed of a graphite/SiC matrix composite, an alumina/SiC matrix composite, or a Kevlar/SiC matrix composite. Other types of suitable ceramic materials may be used herein for the outer tube tip portion 362, the intermediate tube tip insert 392, or other components of the feed injector 300.

The feed injector 300 described herein thus provides an improved feed injector configured to deliver a mixture of fuel, air/oxygen, and steam to the gasifier 150 of the gasification system 146. Specifically, the outer tube tip portion 362 formed of a ceramic matrix composite, a sintered Silicon Carbide, or a sintered Silicon Nitride provides improved creep elongation and resistance to high temperatures, thermal shock, corrosion, and erosion as compared to the outer tube tip portions of known feed injectors formed of HAYNESS 188 or similar materials. Additionally, the intermediate tube tip insert 392 formed of a ceramic composite provides an erosion-resistant barrier to protect the intermediate tube tip portion 364 from coal particle impingement. In this manner, the feed injector 300 addresses the risks of cracking, corrosion, and erosion to increase the life span of the outer tube tip portion 362 and the intermediate tube tip portion 364 and thus reduce the frequency of replacement thereof. Moreover, the outer tube tip portion 362 formed of a ceramic matrix composite, a sintered Silicon Carbide, or a sintered Silicon Nitride eliminates the need for a water cooling system required by known feed injectors and thus greatly reduces the complexity and cost of manufacturing and operating the feed injector 300. Further, the feed injector 300 provides a simplified means of fastening the outer tube tip portion 362 to the outer tube pipe portion 352, which facilitates quick replacement of the outer tube tip portion 362, when necessary, without welding of the components. In this manner, the feed injector 300 reduces the duration of such replacement and thus also reduces the costly shutdown of the gasification system 146 and the overall system in which it is used, such as the IGCC power plant 100.

Figure 8:
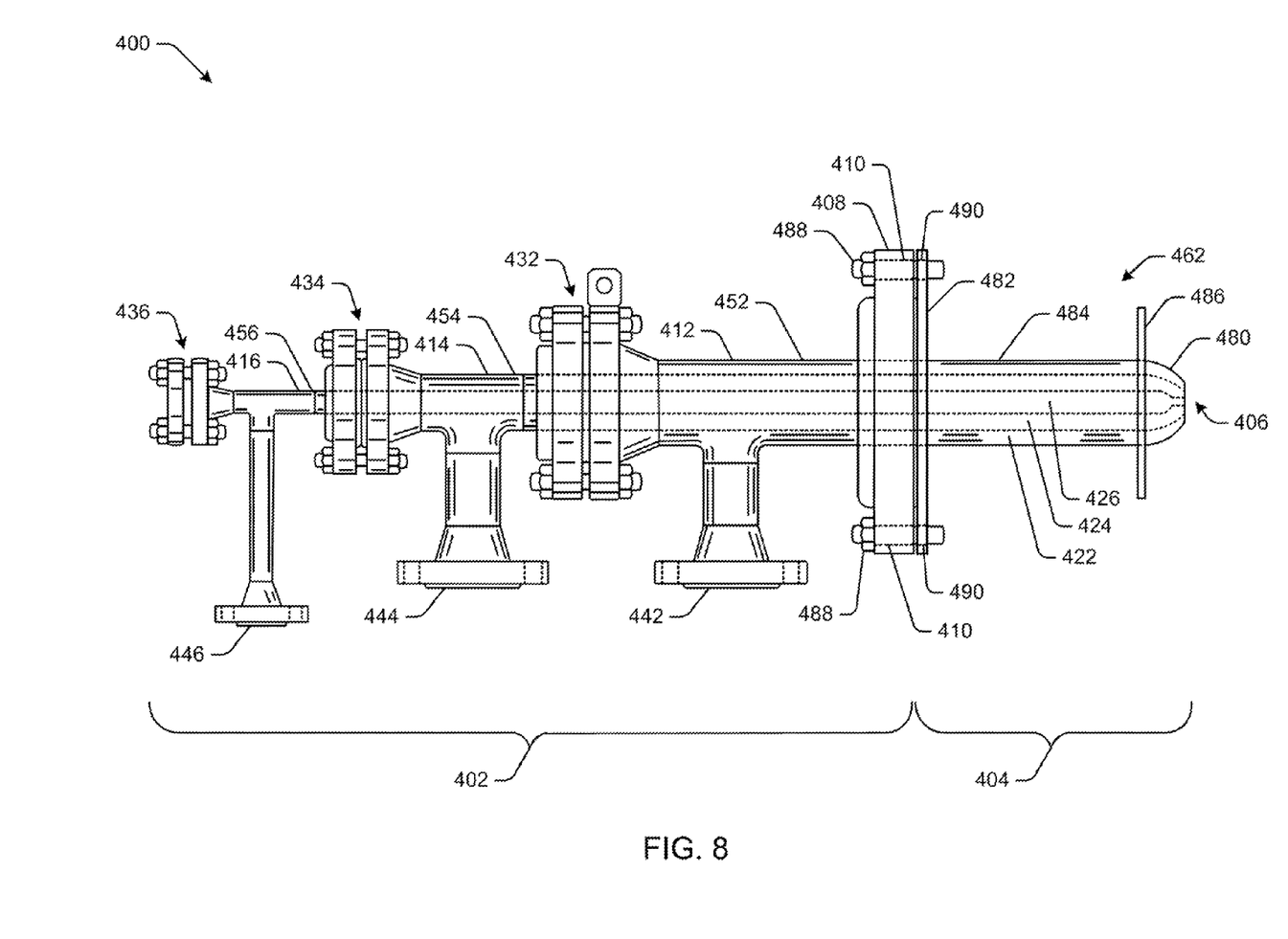
FIG. 8 is a side plan view of another feed injector as may be described herein and as may be used in the gasification system of the integrated gasification combined cycle power plant of FIG. 1.
Figure 9:
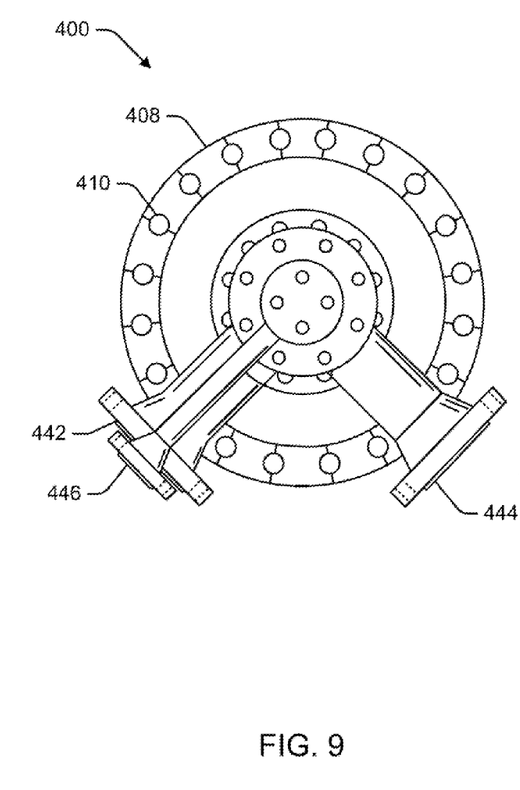
FIG. 9 is an end plan view of the feed injector of FIG. 8.
Figure 10:
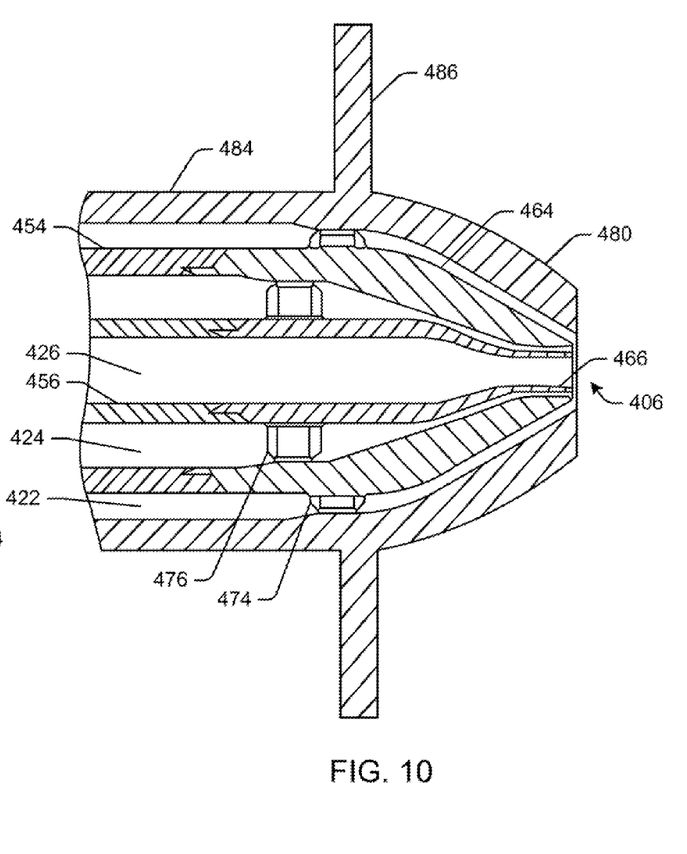
FIG. 10 is a detailed side cross-sectional view of portions of the feed injector of FIG. 8.

FIGS. 8-10 show various views of another feed injector 400 as may be described herein and as may be used in the gasification system 146 of the IGCC power plant 100. Although the feed injector 400 may be described herein as being used in the IGCC power plant 100, it will be understood that the feed injector 400 may be used in gasification systems of various chemical production systems and power systems. The feed injector 400 may include certain components corresponding to those described with respect to the feed injector 200, although certain differences in structure and function may be described herein below. The feed injector 400 may include an upstream portion 402 configured to be positioned outside of the gasifier 150 and to receive the flow of fuel 166, the flow of air 174, and the flow of steam 186 for atomization and mixing. The feed injector 400 also may include a downstream portion 404 configured to be positioned inside of the gasifier 150 and to deliver the mixture of the fuel, air/oxygen, and steam to the reaction zone 154 via a tip end 406. The feed injector 400 further may include a mounting flange 408 configured for mounting the feed injector 400 to the gasifier 150 such that the upstream portion 404 is positioned outside of the gasifier 150 and the downstream portion 406 is positioned inside of the gasifier 150 for operation. The mounting flange 408 may define a number of mounting holes 410 therein for connecting the mounting flange 408 to the gasifier 150 via a number of bolts, screws, or other fasteners.

The feed injector 400 may include a number of bayonet-style tubes arranged in a concentric manner and defining a number of concentric feed passages therethrough. Specifically, the feed injector 400 may include three tubes, an outer tube 412, an intermediate tube 414, and an inner tube 416, which define an outer feed passage 422, an intermediate feed passage 424, and an inner feed passage 426, respectively. As is shown, the outer tube 412 and the outer feed passage 422 may extend from the tip end 406 of the feed injector 400 to an outer tube coupling 432. In a similar manner, the intermediate tube 414 and the intermediate feed passage 424 may extend from the tip end 406 of the feed injector 400 to an intermediate tube coupling 434. Finally, the inner tube 416 and the inner feed passage 426 may extend from the tip end 406 of the feed injector 400 to an inner tube coupling 432. The feed injector 400 may include any number of tubes defining any number of feed passages.

The feed injector 400 further may include an outer tube inlet 442, an intermediate tube inlet 444, and an inner tube inlet 446 attached to the outer tube 412, the intermediate tube 414, and the inner tube 416, respectively, along the upstream portion 402 of the feed injector 400. The outer tube inlet 442 may be configured to direct a first portion of the flow of air 174 into the outer feed passage 422 for passage therethrough and into the gasifier 150. In some embodiments, the outer tube inlet 442 also may be configured to direct a portion of the flow of steam 186 into the outer feed passage 422. The intermediate tube inlet 444 may be configured to direct the flow of fuel 166 into the intermediate feed passage 424 for passage therethrough and into the gasifier 150. In some embodiments, the intermediate tube inlet 444 also may be configured to direct a portion of the flow of steam 186 into the intermediate feed passage 424. The inner tube inlet 446 may be configured to direct a second portion of the flow of air 174 into the inner feed passage 426 for passage therethrough and into the gasifier 150. In some embodiments, the inner tube inlet 446 also may be configured to direct a portion of the flow of steam 186 into the inner feed passage 426.

As is shown, the bayonet-style tubes of the feed injector 400 each may include a pipe portion and a tip portion fastened to the pipe portion. Specifically, the outer tube 412 may include an outer tube pipe portion 452 and an outer tube tip portion 462 as may be fastened to the outer tube pipe portion 452 in a manner described in detail herein below. The intermediate tube 414 may include an intermediate tube pipe portion 454 and an intermediate tube tip portion 464 fastened to the intermediate tube pipe portion 454, for example, by welding. The inner tube 416 similarly may include an inner tube pipe portion 456 and an inner tube tip portion 466 fastened to the inner tube pipe portion 456, for example, by welding. In this manner, the tip portions of the tubes may be replaced when necessary due to cracking, corrosion, or erosion that may occur as discussed herein above during operation of the feed injector 400. In some embodiments, one or more of the tubes may include one or more centering fins configured to maintain the concentric arrangement of the tubes and the feed passages. For example, the intermediate tube 414 may include intermediate tube centering fins 474 extending from the intermediate tube tip portion 464, and the inner tube 416 may include inner tube centering fins 476 extending from the inner tube tip portion 466. In some embodiments, the centering fins may be integrally formed with the respective tip portion as a single component. Alternatively, the centering fins may be attached to the respective tip portion, for example, by welding.

The outer tube tip portion 462 may include a tip region 480 having a tapered nozzle shape, a flange region 482 having a disc shape, and a pipe region 484 having a tubular shape extending between the tip region 480 and the flange region 482. In some embodiments, the outer tube tip portion 462 also may include a shield region 486 having a disc shape extending radially outward and positioned immediately upstream of the tip region 480. In this manner, the shield region 486 may extend toward a neck of the gasifier 150 and may be configured to prevent hot recirculating gas entrainment from entering the neck region during operation of the gasifier 150. As is shown, the tip region 480, the flange region 482, the pipe region 484, and the shield region 486 of the outer tube tip portion 462 may be integrally formed as a single component. The outer tube tip portion 462 may be fastened to the mounting flange 408, as is shown. Specifically, the outer tube tip portion 462 may be fastened to the mounting flange 408 via a number of bolts, screws, or other fasteners 488 extending through the mounting holes 410 and mating holes 490 defined in the flange region 482 of the outer tube tip portion 462. Alternatively, the outer tube tip portion 462 and the mounting flange 408 may be fastened to one another via one or more clamps. Based on the arrangement of the flange region 482 and the mounting flange 408, the outer tube tip portion 462 may be configured to act as a heat shield for the mounting flange 408 during operation of the feed injector 400. In some embodiments, the intermediate tube tip portion 464 and/or the inner tube tip portion 466 may be configured in a manner similar to the outer tube tip portion 462, including a tip region, a flange region, and a pipe region integrally formed as a single component and fastened to the mounting flange 408.

Certain components of the feed injector 400 may be formed of various metals or metal alloys. For example, the mounting flange 408 may be formed of SA182 F11 C12 chromium-molybdenum alloy, the outer tube pipe portion 452 may be formed of INCONEL 625 nickel-chromium alloy or INCONEL 600 nickel-chromium alloy, the intermediate tube tip portion 464 may be formed of HAYNESS 188 cobalt-nickel-chromium-tungsten alloy, and the inner tube tip portion 466 may be formed of HAYNESS 188 cobalt-nickel-chromium-tungsten alloy. These components generally may be forged, machined, and welded together as described herein above.

In contrast to the metal or metal alloy components, certain components of the feed injector 400 may be formed of various ceramic materials. For example, the outer tube tip portion 462 may be formed of a ceramic matrix composite including a consistent set of ceramic fibers embedded in a ceramic matrix to form a fiber reinforced ceramic. In this manner, when the tip region 480, the flange region 482, the pipe region 484, and the shield region 486 of the outer tube tip portion 462 are integrally formed as a single component, the consistent set of ceramic fibers extends through the regions 480, 482, 484, 486 of the outer tube tip portion 462. Specifically, the ceramic matrix composite may be a melt-infiltrated SiC/SiC matrix composite. Alternatively, the ceramic matrix composite may be a C/SiC matrix composite, an Al/SiC matrix composite, or a Mg/SiC matrix composite. Other types of suitable ceramic matrix composites may be used herein for the outer tube tip portion 462 or other components of the feed injector 400. In other embodiments, the outer tube tip portion 462 may be formed of a sintered Silicon Carbide or a sintered Silicon Nitride. In some embodiments, the intermediate tube tip portion 464 and/or the inner tube tip portion 466 also may be formed of a ceramic matrix composite. Other types of suitable ceramic materials may be used herein for the outer tube tip portion 462, the intermediate tube tip portion 464, the inner tube tip portion 466, or other components of the feed injector 400.

The feed injector 400 described herein thus provides an improved feed injector configured to deliver a mixture of fuel, air/oxygen, and steam to the gasifier 150 of the gasification system 146. Specifically, the outer tube tip portion 462 formed of a ceramic matrix composite, a sintered Silicon Carbide, or a sintered Silicon Nitride provides improved creep elongation and resistance to high temperatures, thermal shock, corrosion, and erosion as compared to the outer tube tip portions of known feed injectors formed of HAYNESS 188 or similar materials. In this manner, the feed injector 400 addresses the risks of cracking, corrosion, and erosion to increase the life span of the outer tube tip portion 462 and thus reduce the frequency of replacement thereof. Moreover, the outer tube tip portion 462 formed of a ceramic matrix composite, a sintered Silicon Carbide, or a sintered Silicon Nitride eliminates the need for a water cooling system required by known feed injectors and thus greatly reduces the complexity and cost of manufacturing and operating the feed injector 400. Further, the feed injector 400 provides a simplified means of fastening the outer tube tip portion 462 to the outer tube pipe portion 452 via the mounting flange 408, which facilitates quick replacement of the outer tube tip portion 462, when necessary, without welding of the components. In this manner, the feed injector 400 reduces the duration of such replacement and thus also reduces the costly shutdown of the gasification system 146 and the overall system in which it is used, such as the IGCC power plant 100.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A feed injector for a gasification system, the feed injector comprising:
an inner tube defining an inner feed passage therein;
an intermediate tube defining an intermediate feed passage therein; and
an outer tube positioned about a longitudinal axis of the feed injector and defining an outer feed passage therein, wherein the outer tube comprises an outer tube pipe portion and an outer tube tip portion attached to one another, wherein the outer tube tip portion comprises a pipe region and a flange region extending radially outward beyond the pipe region, and wherein the pipe region and the flange region are integrally formed of a ceramic matrix composite, a sintered Silicon Carbide, or a sintered Silicon Nitride.

2. The feed injector of claim 1, wherein the outer tube tip portion further comprises a tip region, and wherein the pipe region extends axially between the tip region and the pipe region.

3. The feed injector of claim 2, wherein the tip region has a tapered nozzle shape, the flange region has a disc shape, and the pipe region has a tubular shape.

4. The feed injector of claim 2, wherein the outer tube tip portion further comprises a shield region extending radially outward beyond the pipe region and positioned upstream of the tip region.

5. The feed injector of claim 2, wherein the tip region, the flange region, and the pipe region are integrally formed of the ceramic matrix composite, the sintered Silicon Carbide, or the sintered Silicon Nitride.

6. The feed injector of claim 2, wherein the outer tube pipe portion comprises a flange region, and wherein the outer tube pipe portion and the outer tube tip portion are attached to one another via the flange regions thereof.

7. The feed injector of claim 2, further comprising a mounting flange configured for mounting the feed injector to a gasifier of the gasification system, wherein the outer tube pipe portion and the outer tube tip portion are attached to one another via the mounting flange and the flange region of the outer tube tip portion.

8. The feed injector of claim 1, wherein the outer tube pipe portion is formed of a metal or metal alloy, and wherein the outer tube tip portion is formed of a melt-infiltrated SiC/SiC matrix composite.

9. The feed injector of claim 1, wherein the intermediate tube comprises an intermediate tube pipe portion and an intermediate tube tip portion attached to one another.

10. The feed injector of claim 9, wherein the intermediate tube tip portion is formed of a ceramic matrix composite.

11. The feed injector of claim 10, wherein the intermediate tube further comprises a plurality of centering fins extending from the intermediate tube tip portion, and wherein the centering fins and the intermediate tube tip portion are integrally formed of the ceramic matrix composite.

12. The feed injector of claim 9, wherein the intermediate tube further comprises an intermediate tube tip insert positioned within the intermediate tube tip portion.

13. The feed injector of claim 12, wherein the intermediate tube tip insert is formed of an alumina ceramic composite.

14. The feed injector of claim 1, wherein the inner tube comprises an inner tube pipe portion, an inner tube tip portion attached to the inner tube pipe portion, and an inner tube tip covering positioned over an outer surface of the inner tube tip portion, and wherein the inner tube tip covering is formed of an alumina ceramic composite.

15. A method of operating a feed injector of a gasification system, the method comprising:
directing a first flow of air through an inner feed passage defined within an inner tube;
directing a flow of fuel through an intermediate feed passage defined within an intermediate tube;
directing a second flow of air through an outer feed passage defined within an outer tube positioned about a longitudinal axis of the feed injector; and
mixing the first flow of air, the second flow of air, and the flow of fuel within a reaction zone of a gasifier to produce a syngas;
wherein the outer tube comprises an outer tube pipe portion and an outer tube tip portion attached to one another, wherein the outer tube tip portion comprises a pipe region and a flange region extending radially outward beyond the pipe region, and wherein the pipe region and the flange region are integrally formed of a ceramic matrix composite, a sintered Silicon Carbide, or a sintered Silicon Nitride.

16. An integrated gasification combined cycle power plant, comprising:
a gas turbine engine comprising a compressor, a combustor in communication with the compressor, and a turbine in communication with the combustor; and
a gasification system comprising a gasifier and a feed injector, wherein the feed injector comprises:
an inner tube defining an inner feed passage therein;
an intermediate tube defining an intermediate feed passage therein; and
an outer tube positioned about a longitudinal axis of the feed injector and defining an outer feed passage therein, wherein the outer tube comprises an outer tube pipe portion and an outer tube tip portion attached to one another, wherein the outer tube tip portion comprises a pipe region and a flange region extending radially outward beyond the pipe region, and wherein the pipe region and the flange region are integrally formed of a ceramic matrix composite, a sintered Silicon Carbide, or a sintered Silicon Nitride.

17. The integrated gasification combined cycle power plant of claim 16, wherein the outer tube tip portion further comprises a tip region having a tapered nozzle shape, wherein the flange region has a disc shape, wherein the pipe region has a tubular shape extending axially between the tip region and the pipe region, and wherein the tip region, the flange region, and the pipe region are integrally formed of the ceramic matrix composite, the sintered Silicon Carbide, or the sintered Silicon Nitride.

18. The integrated gasification combined cycle power plant of claim 16, wherein the outer tube pipe portion is formed of a metal or metal alloy, and wherein the outer tube tip portion is formed of a melt-infiltrated SiC/SiC matrix composite.

19. The integrated gasification combined cycle power plant of claim 16, wherein the intermediate tube comprises an intermediate tube pipe portion, an intermediate tube tip portion attached to the intermediate tube pipe portion, and an intermediate tube tip insert positioned within the intermediate tube tip portion, and wherein the intermediate tube tip insert is formed of an alumina ceramic composite.

20. The integrated gasification combined cycle power plant of claim 16, wherein the inner tube comprises an inner tube pipe portion, an inner tube tip portion attached to the inner tube pipe portion, and an inner tube tip covering positioned over an outer surface of the inner tube tip portion, and wherein the inner tube tip covering is formed of an alumina ceramic composite.

* * * * *